Sept. 9, 1952 P. A. SEAY 2,610,312
SERVOMOTOR APPARATUS
Filed Feb. 3, 1949
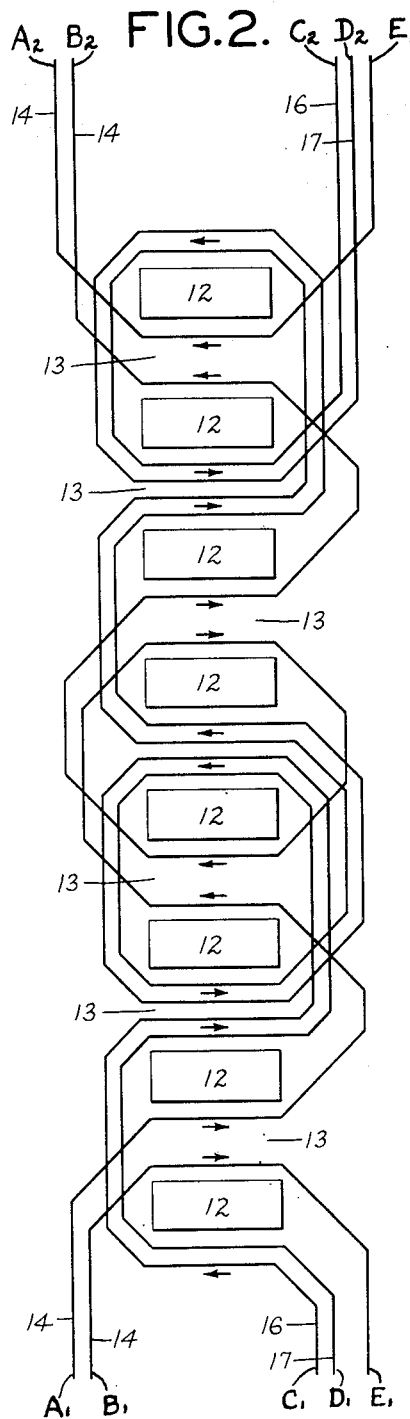
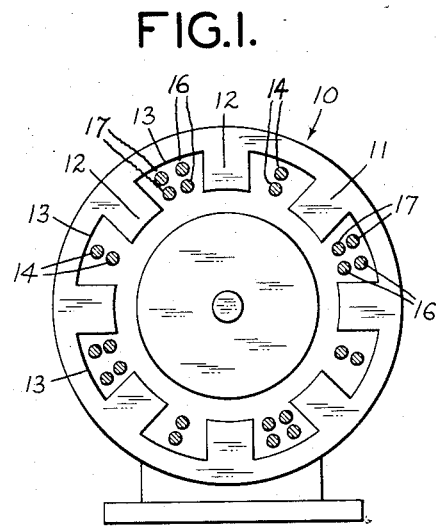
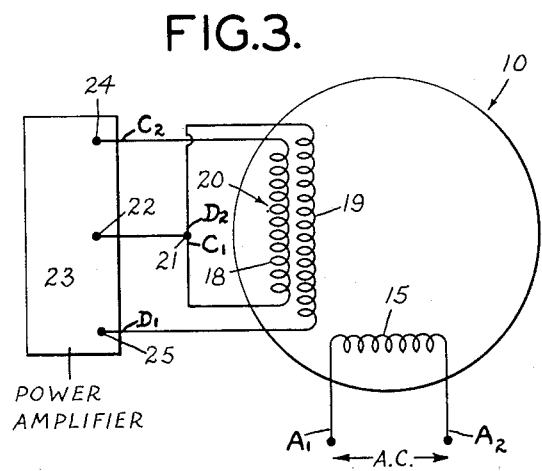
INVENTOR.
PERRY A. SEAY
BY
Campbell, Brumbaugh, Free & Graves
HIS ATTORNEYS.

Patented Sept. 9, 1952

2,610,312

UNITED STATES PATENT OFFICE 2,610,312

SERVOMOTOR APPARATUS

Perry A. Seay, New York, N. Y., assignor to Reeves Instrument Corporation, New York, N. Y., a corporation of New York Application February 3, 1949, Serial No. 74,417

6 Claims. (Cl. 318—207)

The present invention relates to servomotor apparatus and more particularly to new and improved polyphase alternating current servomotor apparatus that is not adversely affected by the presence of D. C. in the windings.

Polyphase alternating current servomotors are widely used for control purposes. Such motors are often designed to operate from a two-phase A. C. source and they comprise a squirrel cage or drag cup rotor and a stator provided with separate fixed field and control field windings disposed in space quadrature. Generally one winding is energized by A. C. of fixed value while the other winding is energized by a control voltage of variable magnitude and in phase quadrature with the fixed voltage applied to the other winding.

In many applications where the control signal comprises a D. C. average value on which is superimposed an A. C. control signal, it is generally desirable to provide some means for keeping the D. C. component out of the control field winding. If this is not done, the D. C. field established by the winding tends to produce an undesirable drag on the rotor and may introduce errors. For this reason, it is the conventional practice to interpose a power transformer between the motor control field winding and the source of the control signal which may be a power amplifier, for example. However, this is an objectionable expedient since it introduces added bulk and weight to the apparatus, whereas compactness and lightness of weight are often major considerations.

It is an object of the invention, accordingly, to provide new and improved polyphase A. C. servomotor apparatus in which a control field winding can be excited by a control signal including a D. C. component without adversely affecting the operation of the apparatus.

Another object of the invention is to provide new and improved servomotor apparatus of the above character in which any D. C. component in the control signal is effectively cancelled out in the motor itself.

The objects of the invention are obtained by providing a polyphase A. C. servomotor having two control field windings wound in the same slots and so connected to the control signal source that any D. C. field produced by one of said windings is substantially cancelled by an equal and opposite D. C. field produced by the other of said windings, while the A. C. fields produced by the two windings are in the same direction. By virtue of this construction, the novel servomotor apparatus of the invention can be directly connected to an output comprising an A. C. control signal superimposed on a D. C. component without adversely affecting the operation of the apparatus.

Additional objects and advantages of the invention will be apparent from the following detailed description of a typical embodiment, taken in conjunction with the accompanying drawings, in which:

Fig. 1 is a schematic end view of servomotor apparatus constructed according to the invention, with an end plate removed;

Fig. 2 is a developed view of a typical stator winding for the servomotor shown in Fig. 1; and Fig. 3 illustrates schematically servomotor apparatus connected in a typical control system.

While the invention may be readily applied to several different forms of polyphase alternating current motors, it will be described herein, by way of illustration, as adapted to a simple two phase, drag cup rotor, wound stator, servomotor of the type usually employed for positioning an object. As shown in Fig. 1, the servomotor apparatus 10 may comprise a laminated yoke 11 provided with a plurality of angularly spaced apart teeth 12 forming a plurality of slots 13 therebetween in which the conductors comprising the several windings are adapted to be received.

In the typical embodiment shown in Fig. 1 eight angularly spaced apart teeth 12 are shown, with a corresponding number of slots 13, as required for a four pole motor. Alternate slots 13 contain the conductors 14 comprising a fixed field winding 15 (Fig. 3) which is adapted to be energized by A. C. of substantially constant magnitude from any suitable source (not shown). The remaining alternate slots 13 carry the conductors 16 and 17 comprising the two portions 18 and 19, respectively, of a control field winding 20 (Fig. 3). For the sake of simplicity, the connections between the several conductors in the slots 13 are not shown in Fig. 1.

The details of the fixed field winding 15 and the control field winding 20 will be better understood from the developed view shown in Fig. 2.

As shown in this figure, both windings are lap wound in the usual configuration. However, the control field winding 20 comprises two separate windings 18 and 19 formed by the conductors 16 and 17, respectively, both of which windings lie in the same slots. The two winding portions 18 and 19 have the same number of turns and are connected in series opposing (Figs. 2 and 3), their opposite ends $C_1$ and $D_2$ being connected to a common point 21 which, in turn, is connected to the terminal 22 of a conventional power amplifier 23. The respective free ends $C_2$ and $D_1$ of the winding portions 18 and 19 are connected to the terminals 24 and 25, respectively, of the amplifier 23. Also, $A_1$ is connected to $A_2$ and $E_1$ is connected to $E_2$ in Fig. 2.

In the usual position control system, the output of the amplifier 23 is a D. C. average value upon which is superimposed an A. C. control signal. The D. C. component is the usual plate supply voltage which is applied at the terminal 22 and through the winding portions 18 and 19 to the terminals 24 and 25, respectively, of the amplifier 23 which, in turn, are connected to the plate electrodes of a pair of push-pull output tubes (not shown) in the amplifier 23.

With the winding portions 18 and 19 connected as shown in Fig. 3, it will be apparent that the resultant D. C. flux produced by D. C. flowing in opposite directions therethrough will be zero. On the other hand, the alternating signal component appears at the terminals 24 and 25 of the amplifier 23 so that the resultant flux produced thereby in the winding portions 18 and 19 is substantially twice the flux produced by either one alone. As a result, the control field winding 20 of the servomotor 10 does not respond at all to D. C. in the output of the amplifier 23 but is fully responsive to any A. C. control signal component.

It will be apparent, therefore, that the novel servomotor construction of this invention can be directly connected to the output of a conventional servoamplifier without the necessity for interposing a power transformer to eliminate the D. C. component. By virtue of this novel construction, the resulting servomotor apparatus is compact, light in weight and highly effective in operation.

It will be understood that the specific embodiment described herein by way of example is susceptible of numerous changes in form and detail within the scope of the invention. The single embodiment disclosed, therefore, is not to be regarded as imposing any limitations upon the scope of the following claims.

I claim:

1. In alternating current dynamo electric apparatus having a rotor member and a stator member, and means forming a circumferential array of angularly spaced apart winding receiving slots in at least one of said members, the combination of a winding disposed in certain of said slots, a second similar winding also disposed in said certain slots, means connecting one end of one of said windings and the opposite end of the other winding to a common terminal, and means connecting the other ends of said windings to two other terminals, respectively.

2. In polyphase alternating current servomotor apparatus, the combination of a rotor member, a stator member, means forming a circumferential array of angularly spaced apart winding receiving slots in at least one of said members, a pair of substantially identical windings in certain of said slots, means connecting one end of one of said windings and the opposite end of the other winding to a common terminal, and means connecting the other ends of said windings to two other terminals, respectively.

3. In polyphase alternating current servomotor apparatus, the combination of a rotor member, a stator member, a first winding on said stator, a pair of substantially identical windings on said stator and in space quadrature with said first winding, means connecting one winding end of said pair and the opposite end of the other winding of said pair to a common terminal, and means connecting the other ends of the windings comprising said pair to two other terminals, respectively.

4. In polyphase alternating current servomotor apparatus, the combination of a rotor member, a stator member, means forming a circumferential array of angularly spaced apart axially extending, winding receiving slots in said stator, a first distributed winding in certain of said slots corresponding to a first phase, substantially identical second and third distributed windings in other of said slots corresponding to another phase, means connecting one end of said second winding and the opposite end of said third winding to a common terminal, and means connecting the other ends of said second and third windings to two other terminals, respectively.

5. In polyphase alternating current servomotor apparatus, the combination of a rotor member, a stator member, means forming a circumferential array of angularly spaced apart, axially extending, winding receiving slots in said stator, a first distributed winding in certain of said slots corresponding to a first phase, substantially identical second and third distributed windings, in other of said slots corresponding to another phase, means connecting one end of said second winding and the opposite end of said third winding together to form a centertap, amplifier means providing a push-pull output comprising both alternating current and direct current components between a common terminal and either of two other terminals thereof, means connecting said amplifier means common terminal to said centertap, and means connecting the other ends of said second and third windings to the two other terminals of said amplifier means, respectively.

6. In combination, a reversible alternating current servomotor, a stator therefor having a circumferential array of angularly spaced apart slots, a first winding located in certain ones of said slots through which winding an alternating current of a fixed phase is passed, and a pair of field windings producing a field displaced both mechanically and in electrical phase relationship from the field produced by said first winding, each of said pair of field windings having corresponding turns in the same ones of said slots other than those slots containing said first winding, the relative direction of displacement in electrical phase between said fields determining the direction of rotation of said servomotor, a power amplifier having its output supplied from the plates of a pair of electron tubes connected in push-pull, the plate connections comprising the first two output connections of said power amplifier, a third output connection through which the D. C. plate supply for said pair of electron tubes is connected, a direct conductive connection between opposite ends of said pair of windings, said last named connection being also directly connected to the third one of said output connections, the said first two output connections being directly conductively connected respectively to the remaining two ends of the said pair of windings whereby the fields due to the D. C. component of the plate current flowing through said pair of windings is balanced out.

PERRY A. SEAY.

REFERENCES CITED

The following references are of record in the file of this patent:

UNITED STATES PATENTS

| Number | Name | Date |
| --- | --- | --- |
| 2,183,725 | Seeley | Dec. 19, 1939 |
| 2,192,022 | Wills | Feb. 27, 1940 |
| 2,417,868 | Glass | Mar. 25, 1947 |

OTHER REFERENCES

"Radio Engineering," F. E. Terman, McGraw-Hill Book Company, New York, New York, second edition, 1937, page 305.